Jan. 20, 1925.
J. C. SCHAF, JR
1,523,723
UNIVERSAL HOLDING CARRIAGE FOR TEST STANDS AND LATHES
Filed Oct. 31, 1921  2 Sheets-Sheet 1
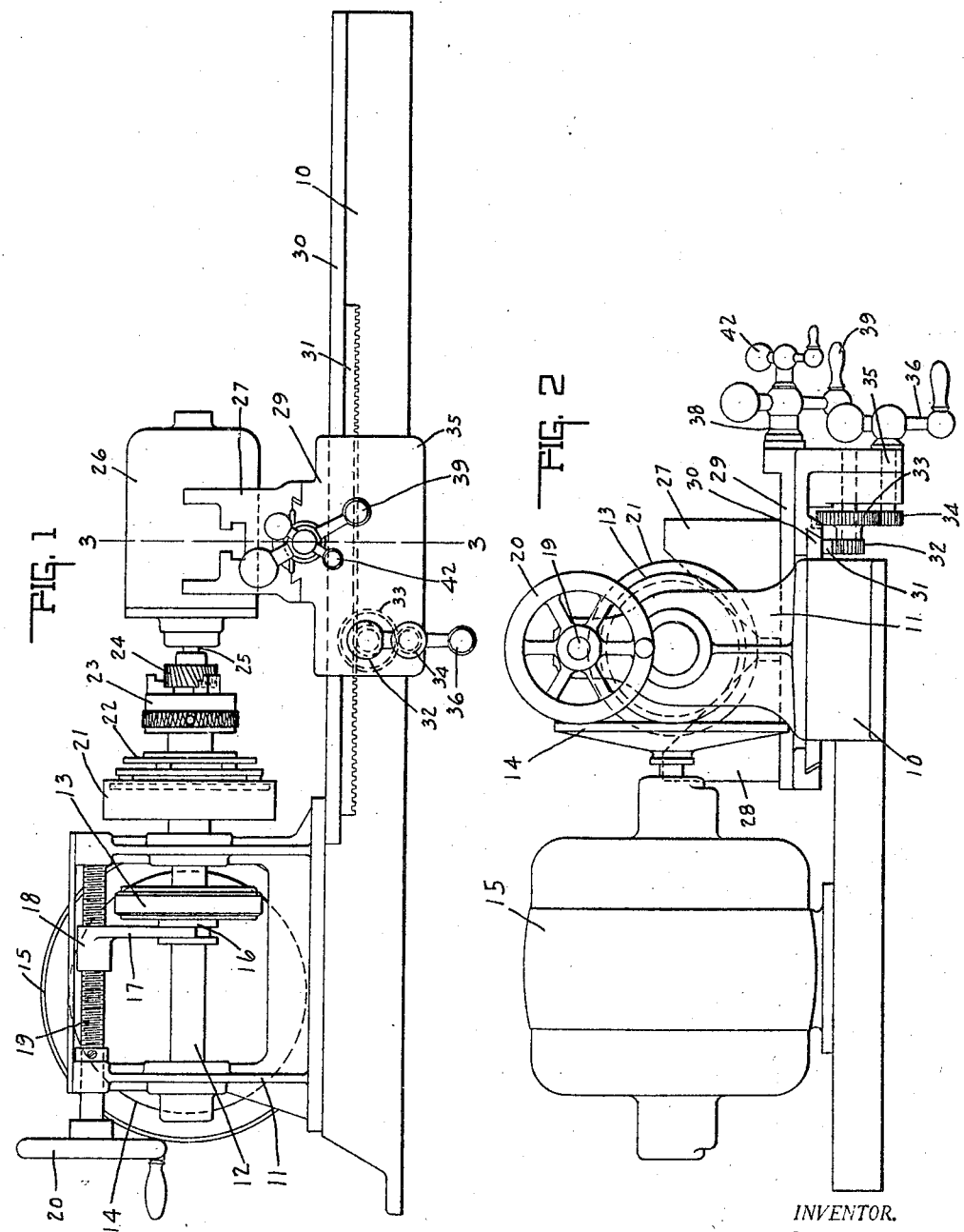
INVENTOR.
JOSEPH C. SCHAF JR.
BY
ATTORNEYS.

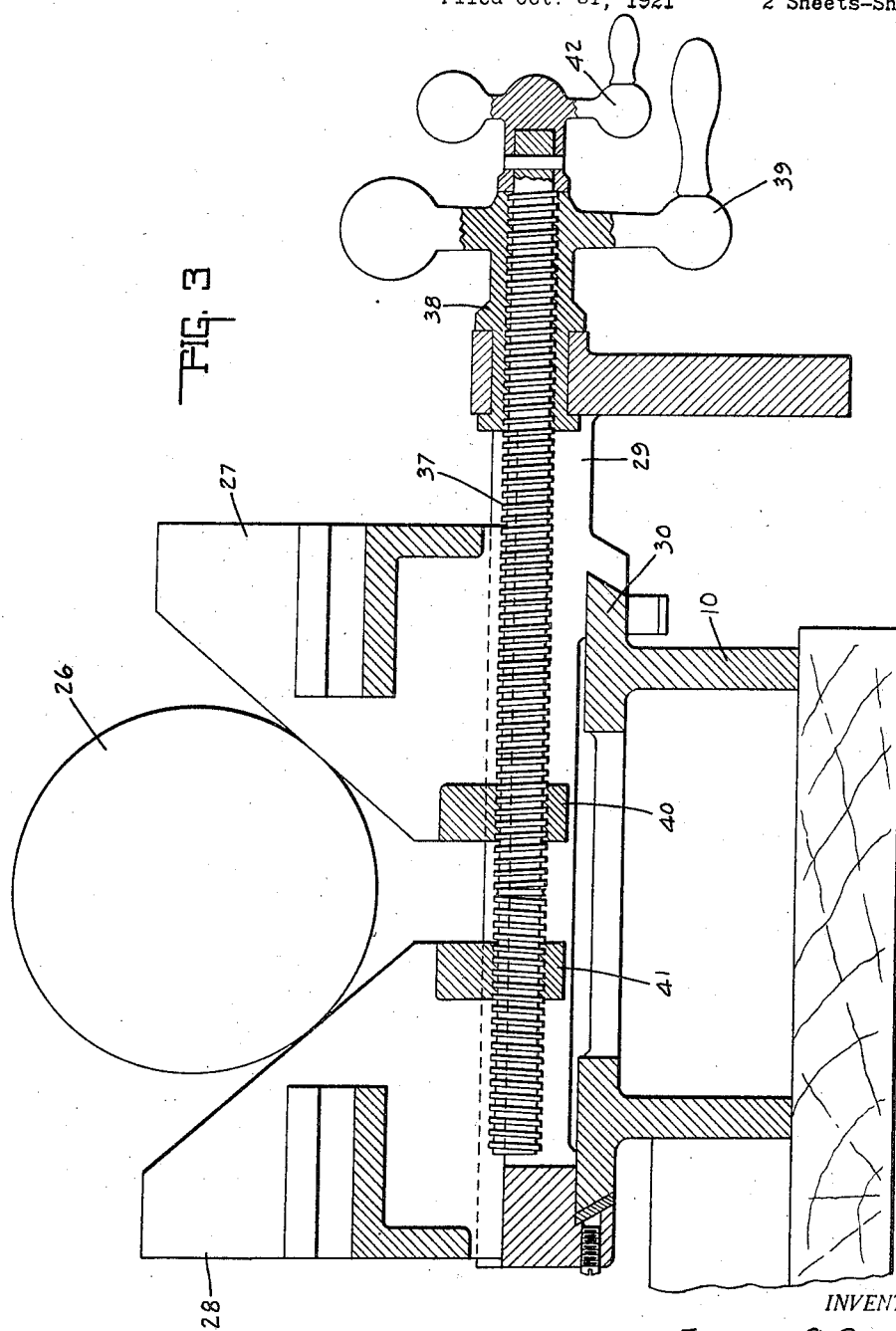

Patented Jan. 20, 1925.

1,523,723

UNITED STATES PATENT OFFICE.

JOSEPH C. SCHAF, JR., OF INDIANAPOLIS, INDIANA.

UNIVERSAL HOLDING CARRIAGE FOR TEST STANDS AND LATHES.

Application filed October 31, 1921. Serial No. 511,798.

*To all whom it may concern:*

Be it known that I, JOSEPH C. SCHAF, Jr., a citizen of the United States, and a resident of Indianapolis, county of Marion, and State of Indiana, have invented a certain new and useful Universal Holding Carriage for Test Stands and Lathes; and I do hereby declare that the following is a full, clear, and exact description thereof, reference being had to the accompanying drawings, in which like numerals refer to like parts.

This invention relates to a test stand for generators, starting motors and the like for testing either their electrical or mechanical defects and adjustments. The invention may also be applied to lathe turrets and other machines wherein it is desirable to grip and adjust the position of the article to be worked upon.

The main object of the invention is to provide a longitudinal and lateral adjustment of a pair of blocks between which the article to be worked on is secured, and also adjust said blocks relative to each other for engaging and holding objects of various sizes and shapes. When it is desired to work upon an irregular shaped article having a shaft positioned therein, it is difficult to center the shaft unless the supporting and clamping blocks are properly positioned and adjusted relative to each other and laterally of the machine, and it is the purpose of this invention to provide such adjustment for properly positioning the article and centering it.

The full nature of this invention will be understood from the accompanying drawings and the following description and claims.

In the drawings Fig. 1 is a side elevation of the testing machine. Fig. 2 is an end elevation of the same. Fig. 3 is a vertical section taken on the line 3—3 of Fig. 2.

In the drawings there is shown a bed 10 mounted on a frame or base of the usual construction, not shown herein. On one end of the bed there is provided a mounting 11 adapted to support a shaft 12 upon which is slidably keyed a friction wheel 13 adapted to be frictionally engaged by the friction disk 14 which is driven by the electric motor 15. For adjusting the position of the friction wheel 13 with respect to the disk 14, for varying the speed at which it is driven, there is a collar 16 secured to the wheel 13 and slidable on the shaft 12, which is engaged by the jaw 17 extending from a threaded sleeve 18. The sleeve 18 is mounted upon the threaded adjusting screw 19 supported in the mounting 11 and turned by the hand wheel 20. As the screw 19 is turned, the friction wheel 13 is moved back and forth upon the shaft 12 so as to engage the driving friction disk 14 at various positions, whereby it will be driven at varying speeds and directions in the usual manner.

Secured on the end of the shaft 12 there is a fly wheel 21 on which is mounted a flexible connecting member 22 which provides a flexible connection between the driving shaft and the driven shaft on the generator to be tested, wherein the driven shaft and the generator may be slightly out of line. Connected with the flexible connection 22 there is the usual chuck 23 which is shown herein as engaging the clamping and driving gear 24 of the generator to be tested. The driving gear 24 is mounted upon the shaft 25 which is positioned in the generator housing 26. It is the purpose of the machine, as shown herein, to test the generator 26 by driving it from the motor 15 as above described through the flexible driving connection 22 at a specific R. P. M. for testing the current generated thereby.

It has heretofore been difficult to secure the articles to be tested in proper position and alignment with the shaft 12, wherein the articles have been of irregular shape, of different sizes, or their shafts off center. For this purpose there is provided a universal holding carriage so designed that any type of generator or starting motor can be rigidly held and the shaft securely centered with the driving chuck 23. The holding carriage comprises two gripping blocks 27 and 28 having inclined angular engaging surfaces, as shown in Fig. 3. The blocks are mounted upon a sliding carriage 29 adapted to slide longitudinally of the bed 10, and held thereon by the dovetail fit with the table 30 carried on said bed. For moving the carriage longitudinally of the bed there is provided the usual adjusting mechanism comprising a rack 31 adapted to be engaged by the pinion 32 which is driven by the gear 33, which in turn is driven by the pinion 34 mounted on the shaft 35 which is turned by the hand crank 36.

For adjusting the lateral position of the blocks 27 and 28 relative to each other and together, there is provided an oppositely threaded screw shaft 37 extending through the threaded portion of the carriage and laterally thereof, as shown in Fig. 3. The screw shaft screws through the rotary bearing 38 which is supported in the carriage and free to be revolved by the crank 39. It likewise screws through a projection 40 on the block 27, which portion of said screw shaft is provided with a right hand thread. Beyond the projection 40 of the block 27, the screw shaft is provided with a left hand thread which screws through the projection 41 on the block 28. Pinned to the end of the shaft 37 there is a crank 42 which is adapted to turn the screw shaft upon the rotation thereof.

It will, therefore, be seen that upon turning the crank 42 the screw shaft will be turned so as to screw out of the slidable carriage 29 and the bearings 38, and as the threads thereon are right-handed in both the bearing 38 and the projection 40, said screw will also screw through the bearing 40, whereby said bearing and the block 27 will remain stationary. However, by so turning the screw the left-handed threads which screw through the projection 41, will operate to cause said projections to move forwardly toward the projection 40 with the screw shaft, and also be screwed in the same direction so that the block 28 will move forward toward the block 27 at twice the speed of the screw shaft therethrough. This will bring the blocks together, or rather the block 28 up to the block 27, which remains stationary, for gripping the generator 26. For centering the generator the crank 39 is turned while the crank 42 is held stationary. By this operation the screw shaft 37 remains stationary with respect to the projections 40 and 41 so that their relative position is not changed, while the shaft is screwed outwardly by the rotary movement of the bearing 38, or inwardly as the case may be. This outward and inward movement of the non-rotating screw shaft will adjust the pair of blocks laterally of the machine.

When it is desired to move both blocks to and from each other with the same speed and movement, both cranks 39 and 42 may be turned together. Such joint movement causes the screw shaft 37 to turn in place and the blocks to be moved in opposite directions by means of the oppositely disposed screw threads.

While the invention has herein been described as pertaining to a test stand for motors and generators, it may be employed with the same effect and advantages with respect to a lathe or similar machine or tool wherein it may be desirable to clamp and adjust an object for various purposes.

The invention claimed is:

1. The combination with a pair of adjustable clamping members, of means for adjusting said members relative to each other or together as a unit, comprising a threaded screw shaft, one section thereof having a right-handed screw thread passing through one of said members and another section having a left-handed screw thread passing through the other member, a carriage upon which said members are slidably mounted, a rotatable screw thread bearing mounted in said carriage, means for turning said bearing for causing said shaft to be screwed laterally thereof, whereby said members may be adjusted laterally as a unit, and means for turning said shaft whereby it will screw through said bearing and one of said members causing said member to remain in fixed relation with said bearing and causing the other member to move relative to said stationary member by means of the oppositely disposed screw threads.

2. The combination with a pair of adjustable clamping members slidably mounted on a frame, of means for adjusting said members comprising a screw threaded shaft having oppositely directed threads thereon adapted to extend through said members so that said threads engage therewith, and an internally threaded bearing rotatably mounted on said frame against movement longitudinal of said shaft, whereby upon simultaneously turning said shaft and bearing, one of said members will remain stationary while the other is moved.

3. The combination with a pair of adjustable clamping members slidably mounted on a frame, of means for adjusting said members comprising a screw threaded shaft having a handle on one end thereof for turning the same, and a bearing for said screw shaft rotatably mounted in said frame against movement longitudinal of said shaft and having a handle thereon, whereby said bearing may be rotated independently of said shaft in fixed relation with said frame, said shaft may be rotated independently of the rotation of said bearing, and said bearing and shaft may be rotated simultaneously for securing the various adjustments of said members.

In witness whereof, I have hereunto affixed my signature.

JOSEPH C. SCHAF, Jr.